United States Patent [19]
Cwycyshyn et al.

[11] 3,739,906
[45] June 19, 1973

[54] VEHICLE POSITIONING AND RESTRAINT APPARATUS

[75] Inventors: Walter Cwycyshyn, Detroit; Elwyn L. Kitchen, Jr., Troy, both of Mich.

[73] Assignee: General Motors Corporation, Detroit, Mich.

[22] Filed: Oct. 8, 1971

[21] Appl. No.: 187,625

[52] U.S. Cl........ 206/65 R, 105/368 R, 248/119 R
[51] Int. Cl..... B60p 7/08, B61d 45/00, B65d 85/62
[58] Field of Search...................... 206/65 R, 46 M; 220/97 R; 105/369 R, 368 R, 368 T, 369 A; 280/179 A; 296/1 A; 248/119 R, 361 R

[56] References Cited
UNITED STATES PATENTS

| | | |
|---|---|---|
| 1,254,920 | 1/1918 | Mathias........................... 105/368 R |
| 1,780,277 | 11/1930 | Seeley et al...................... 248/119 R |
| 2,521,088 | 9/1950 | Phelps............................. 206/46 M |
| 3,189,313 | 6/1965 | Burns et al...................... 248/361 R |
| 3,605,636 | 9/1971 | Blunden et al.................. 248/119 R |

Primary Examiner—William T. Dixson, Jr.
Attorney—J. L. Carpenter and E. J. Biskup

[57] ABSTRACT

A vehicle positioning and restraint apparatus having a latching mechanism and parallel guide rails which slidably receive tie-down members attached to the underside of a vehicle for holding the vehicle in position during shipment by a carrier.

3 Claims, 6 Drawing Figures

PATENTED JUN 19 1973

INVENTORS
Walter Cwycyshyn, &
BY Elwyn L. Kitchen, Jr.
E. J. Biskup
ATTORNEY

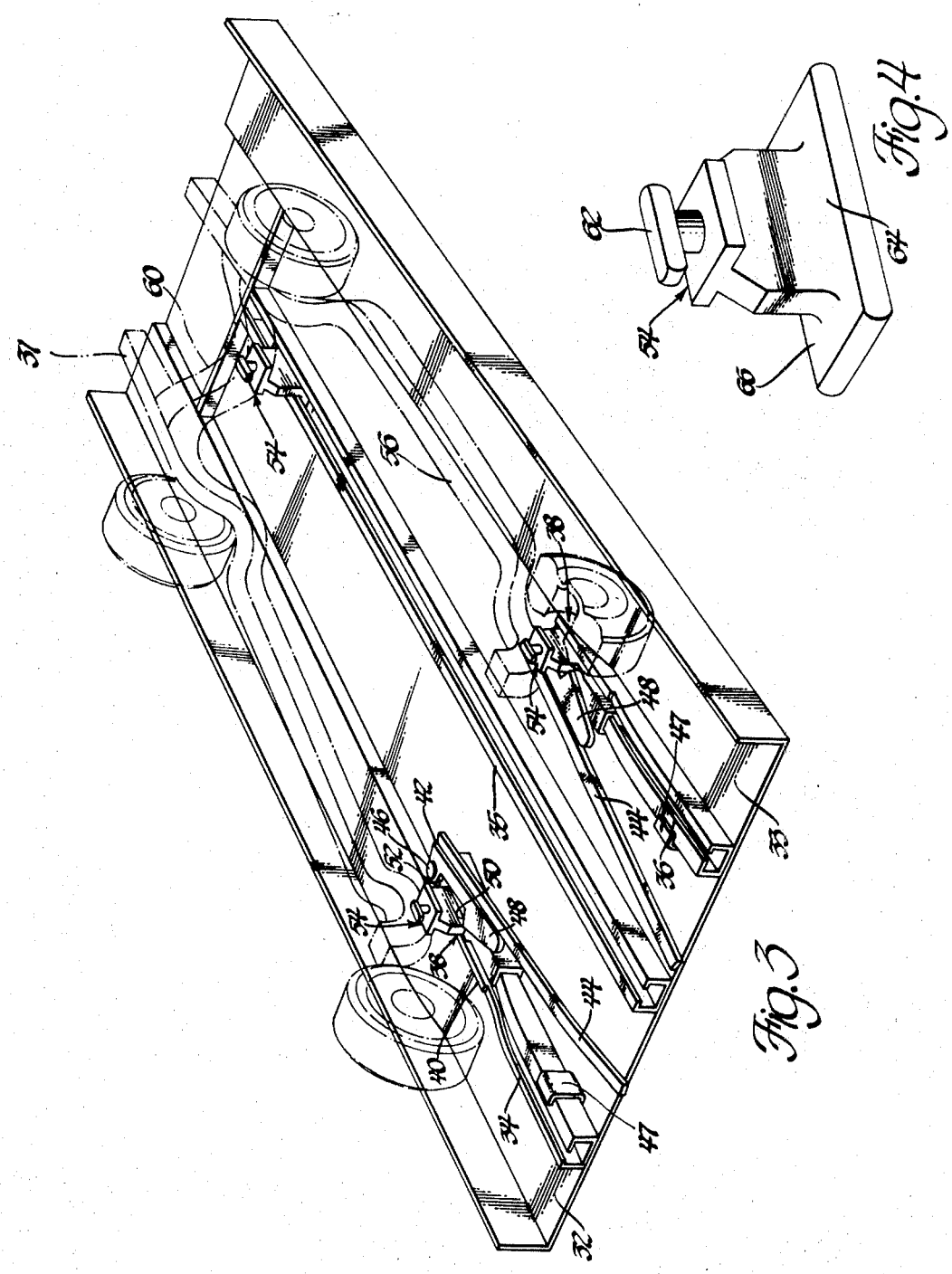

VEHICLE POSITIONING AND RESTRAINT APPARATUS

Most automotive vehicles presently made are shipped from the final assembly plants to dealers on specially designed multi-level railway or highway carriers. The carriers are of the open type and the vehicles are usually loaded end to end on the carrier so as to be arranged in tandem relationship on each level. In both types of carriers it is necessary to provide tie-down devices which secure the vehicle in place so as to preclude movement of the vehicle during transit, and one method presently used for positioning the vehicle in the carrier consists of having the driver simply drive the vehicle onto the carrier. The vehicle is then secured by chaining the frame to the floor of the carrier. The chaining operation consists of placing the hooked end of the chains into holes located in the front and rear ends of the vehicle frames and, afterwards, the chains are tightened by manually operated winches so as to cause the vehicle to be drawn downwardly toward the floor.

The above-described method of positioning and securing the vehicle to carriers has certain drawbacks. For example, if the drivers fails to properly position the vehicle, the chains may become loose and cause the vehicle to experience excessive lateral and longitudinal movement which frequently results in considerable damage to the vehicle. Apart from this problem, the loading and securing of the vehicles require a large number of personnel who must work together in order to manipulate, position, and secure the chains between the vehicle and the floor of the carrier. As a result, the cost incurred in shipping the vehicles becomes extremely large. Another difficulty is that the open form of the carrier causes the vehicles to be unprotected from vandalism and pilferage.

The present invention is intended to alleviate the above-mentioned problems by providing a positioning and restraint apparatus which permits a vehicle to be mechanically loaded onto a carrier, positively located in a predetermined position, and secured to the floor of the carrier in a manner which prevents vertical, lateral and longitudinal movement of the vehicle. In addition, the present invention contemplates utilizing a positioning and restraint apparatus of the aforementioned type in an enclosed shipping container which protects the vehicle from all forms of damage which might occur due to vandalism and flying objects.

In the preferred form, the present invention is incorporated in a narrow fully enclosed shipping container having a plurality of vertically spaced floor portions. Each of the floor portions are located in a horizontal plane and serves to accommodate a vehicle which is mechanically loaded into the container. Three elongated parallel guide rails are fixed to each floor portion along the longitudinal axis thereof and each guide rail is adapted to slidably receive a tie-down device fixed to the underside of a vehicle for restraining the vehicle from movement in a vertical and lateral direction. A latch mechanism is included with at least one of the guide rails for locking one of the tie-down devices in a fixed position and thereby precluding movement of the vehicle along the longitudinal axis of the rails. The latch mechanism has a hand-operated lever supported at one end for pivotal movement about a vertical axis and is formed with a pair of longitudinally spaced stop sections which are located fore and aft of the tie-down device when the latch mechanism is placed in the locked position.

A more complete understanding of the present invention can be obtained from the following detailed description when taken with the drawings in which:

FIG. 3 is a perspective view of the arrangement shown in FIG. 2;

FIG. 4 is a perspective view of a tie-down device used with this invention;

Figure 1:
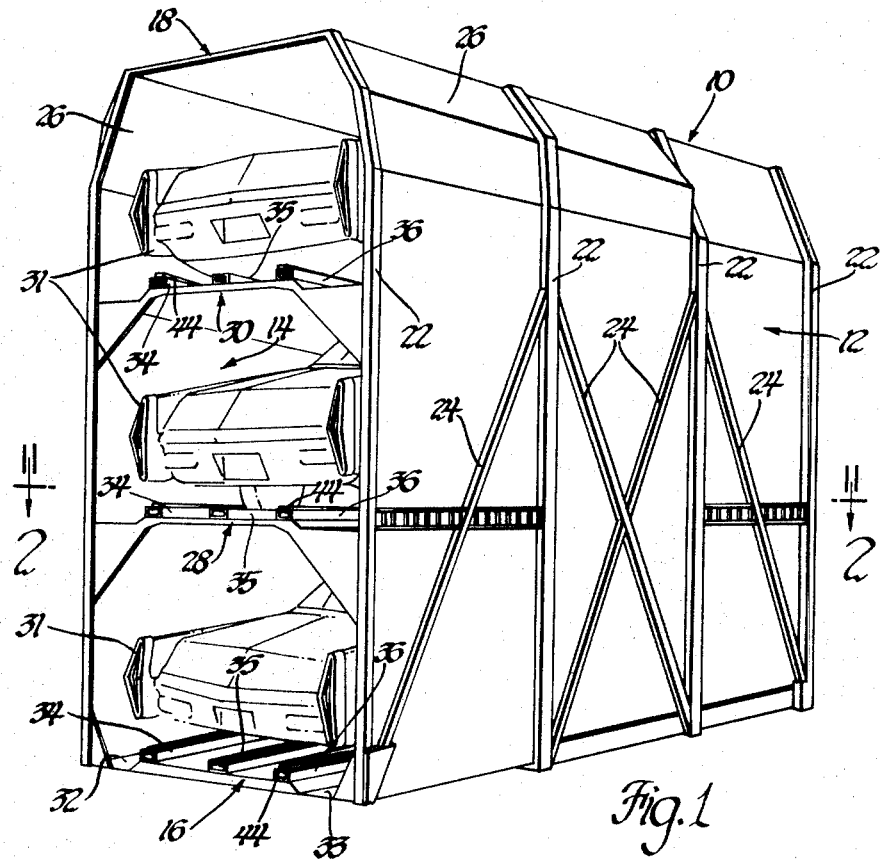
FIG. 1 is a perspective view showing a shipping container incorporating a vehicle positioning and restraint apparatus made according to this invention.
Figure 2:
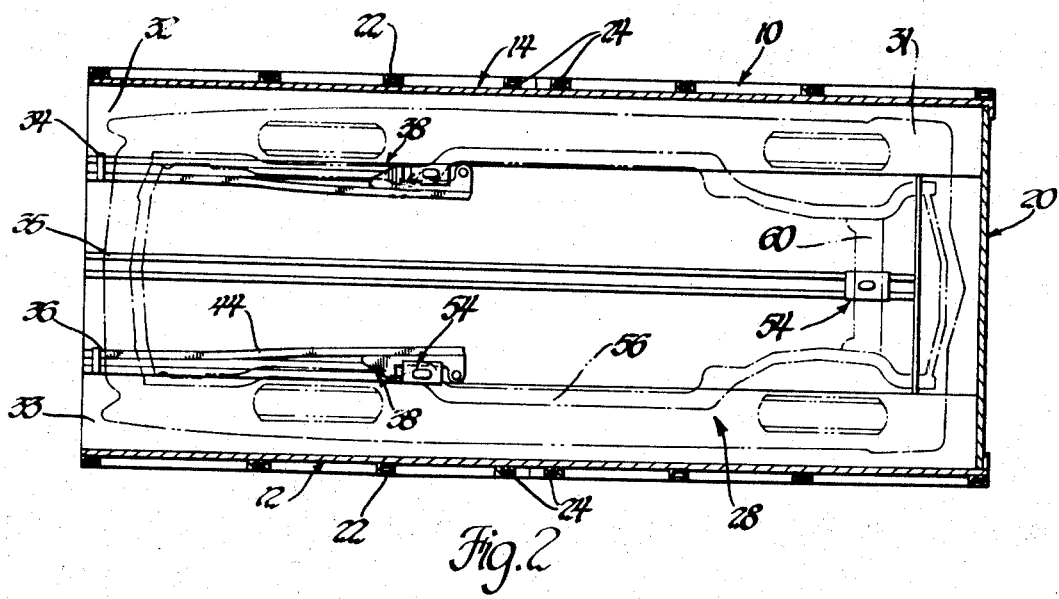
FIG. 2 is a sectional view taken on line 2—2 of FIG. 1.

Referring to the drawings and more particularly FIGS. 1 and 2 thereof, a portable shipping container 10 is shown having laterally spaced parallel side walls 12 and 14, a bottom vehicle supporting floor portion 16, a roof portion 18, and an end wall 20. Each side wall 12 and 14 is reinforced by a plurality of vertical and diagonal structural members 22 and 24, respectively, and has an upper inwardly diverging section 26 which connects with the roof portion 18. The shipping container 10 also includes intermediate floor portions or decks 28 and 30, each of which is also adapted to support a vehicle 31 in a manner as will be hereinafter described. The intermediate floor portions 28 and 30 are located in horizontal planes parallel to the bottom floor portion 16. Thus, a fully enclosed shipping container is provided with one end only open for reception of cargo which in this case is automotive vehicles. As shown, the shipping container 10 is capable of storing three vehicles, afterwhich the shipping container can be placed on a railway flat car and secured thereto for shipping purposes. Although not shown, the railway flat car would carry four shipping containers of the above-described type which would be placed in longitudinal alignment with the open ends of each pair of shipping containers facing each other so as to completely close each shipping container and thereby fully protect the vehicles from damage of the type which frequently occurs to exposed vehicles.

Figure 5:
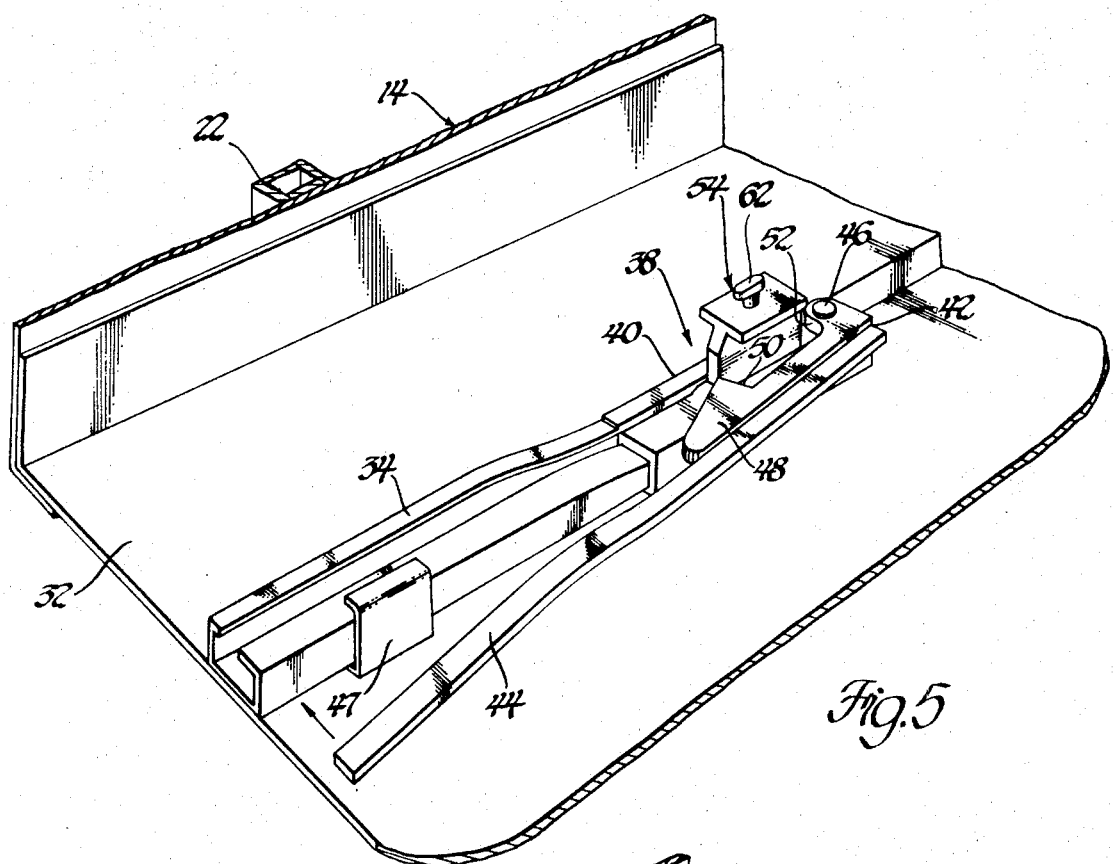
FIG. 5 is an enlarged perspective view showing the latch mechanism incorporated with the present invention with the lock lever positioned in the unlocked position.

Each floor portion 16, 28, and 30 is substantially identical in construction and provides a pair of parallel wheel guide tracks 32 and 33 between which are located three elongated parallel guide rails 34, 35, and 36. Each of the guide rails takes the form of a C-shaped channel and is parallel to the side walls 12 and 14. The center guide rail 35 extends substantially the full length of the shipping container 10, while the outer guide rails 34 and 36 start at the open end of the shipping container and extend for approximately one-third the longitudinal distance thereof. Each outer guide rail 34 and 36 carries a latch mechanism 38 at the inner end thereof which, as seen in FIGS. 4 and 5, comprises a base 40 that serves as a stop and also a lock lever 42 having an elongated handle 44 which is accessible from the open end of the shipping container 10. The inner end of the lock lever 42 is pivotally mounted to the base 40 by a pivotal connection 46 which permits the lock lever 42 to be rotated about a vertical axis between the positions shown in FIGS. 5 and 6, the latter figure showing the handle retained by a clip 47. The inner end of the lock lever 42 also carries a lock member 48 which has longitudinally spaced stop sections 50 and 52 defined by a U-shaped cutout in the lock member 48. The function of the latch mechanism 38 is to lock a tie-down device 54 in position and prevent it from moving in a fore and aft direction.

In this regard, it will be noted that a frame 56 of the type associated with each of the vehicles 31 is shown in phantom lines in FIGS. 2 and 3. The frame 56 is provided with three identical tie-down devices 54 constructed as shown in FIG. 4. One of the tie-down devices 54 is fixed to the front cross member 60 of the frame 56 at the center thereof while the other two tie-down devices 54 are fixed to the frame 56 adjacent to the rear end thereof and inboard of the rear wheels. Each tie-down device 54 has a T-shaped key portion 62 which can be inserted within a suitable oblong aperture provided in the vehicle frame and locked thereto by rotating the tie-down device 90° so as to position a pair of laterally extending arms 64 and 66 in direction parallel to the longitudinal axis of the frame 56.

Figure 6:
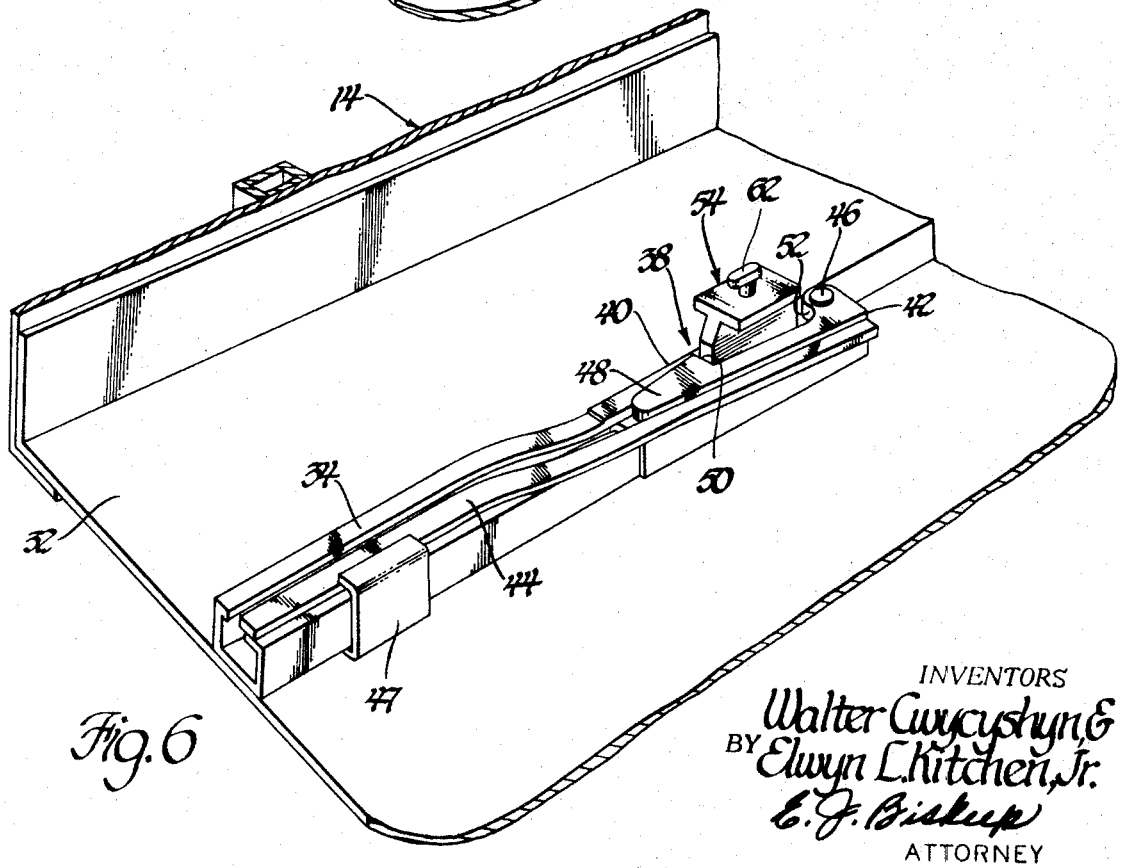
FIG. 6 is a view similar to that shown in FIG. 4 but shows the lock lever positioned in the locked position.

The lateral spacing of the three tie-down devices 54 on the frame 56 corresponds with the lateral spacing of the three guide rails 34, 35, and 36 on each floor portion 16, 28, and 30. Accordingly, when a vehicle 31 is rolled into the shipping container 10 with the tires in the tracks 32 and 33, initially the tie-down device 54 carried by cross member 60 enters the center guide rail 35 and, after the vehicle has moved a sufficient distance into the shipping container 10, the two rear tie-down devices 54 are then received by the outer guide rails 34 and 36. The vehicle continues moving into the shipping container 10 until the rear tie-down devices 54 engage the stop (not shown) formed in the base 40 provided with each outer guide rail. At such time, the vehicle 31 is prevented from moving forwardly and assumes the position shown in FIGS. 3 and 5. In this position, the vehicle 31 is restrained from vertical as well as lateral movement and upon moving the lock lever 42 of each latch mechanism toward the associated guide rail as seen in FIG. 5, the handle 44 moves over the top surface of clip 47 and then drops downwardly so as to be retained by the clip 47 as seen in FIG. 6. In this position of lock lever 42, the rear tie-down devices 54 are restrained from longitudinal movement due to the trapping action which occurs when the lock member 48 assumes the position of FIG. 6. At such time, the vehicle 31 is completely restrained and the entire shipping container 10 can be placed on a railway car for shipping purposes. To release the lock lever 42 from the position of FIG. 6 to that of FIG. 5, the handle 44 is moved slightly toward the adjacent side wall so as to clear the retaining portion of clip 47 and then the handle 44 is moved in the opposite direction.

It will be noted that each of the guide rails 34, 35, and 36 has the inner end thereof progressively tapered downwardly as seen in FIGS. 5 and 6. This arrangement permits the tie-down device 54 to move freely without interference within the associated guide rail during the initial advancement of the vehicle into the shipping container 10. When, however, the vehicle approaches the inner end of the center guide rail 35, the tie-down devices 54 and, accordingly the vehicle frame 56, is drawn downwardly toward the floor sufficiently so that a preload is placed on the suspension system of the vehicle. This preload helps maintain the vehicle in position and assures that the vehicle is securely fastened to the associated floor portion.

Various changes and modifications can be made in this construction without departing from the spirit of the invention. Such changes and modifications are contemplated by the inventors and they do not wish to be limited except by the scope of the appended claims.

We claim:

1. A positioning and restraint apparatus for securing a vehicle to the floor portion of a carrier, comprising a pair of laterally spaced parallel tracks for the wheels of said vehicle, three elongated guide rails fixed to said floor portion between said tracks along axes parallel to the longitudinal axes of said tracks, each of said guide rails adapted to slidably receive a tie-down device fixed to said vehicle for restraining the vehicle from movement in a vertical direction, a latch mechanism fixed to the floor portion and located in axial alignment with one of said guide rails for restraining the associated tie-down device from movement along the longitudinal axis of said one of said guide rails when the vehicle is in a predetermined position on said floor portion, said latch mechanism including a hand-operated lever supported at one end for pivotal movement about a substantially vertical axis and formed with stop means adapted to trap said tie-down device and prevent movement thereof along said longitudinal axis.

2. A positioning and restraint apparatus for securing a vehicle to the floor portion of a carrier, comprising a pair of laterally spaced parallel tracks for the wheels of said vehicle, three elongated guide rails fixed to said floor portion between said tracks, each of said guide rails adapted to slidably receive a tie-down device fixed to said vehicle for restraining the vehicle from movement in a vertical direction and terminating with a tapered section for drawing the vehicle downwardly toward the floor portion, a latch mechanism located at one end of one of said guide rails for restraining the associated tie-down device from movement along the longitudinal axis of said one of said guide rails when the vehicle is in a predetermined position on said floor portion, said latch mechanism including a hand-operated lever supported at one end for pivotal movement about a substantially vertical axis and formed with a pair of longitudinally spaced stop sections which are adapted to overlie said guide rail and trap said tie-down device to prevent movement thereof along said longitudinal axis.

3. A container for shipping vehicles, the container having an open end and a plurality of vertically spaced floor portions enclosed by a pair of side walls, an end wall and a roof, each of said floor portions being located in a substantially horizontal plane and having positioning and restraint means for securing a vehicle thereto, a pair of laterally spaced parallel tracks on said floor portion for accommodating the wheels of said vehicle, said positioning and restraint means comprising three elongated guide rails fixed to each of said floor portions between said tracks along axes parallel to the longitudinal axes of said tracks, each of said guide rails being C-shaped in cross section and adapted to slidably receive a T-shaped tie-down device fixed to said vehicle for restraining the vehicle from movement in a vertical direction, a latch mechanism secured to said floor portion and located at one end of one of said guide rails for restraining one of said tie-down devices from movement along the longitudinal axis of said one of said tracks, said latch mechanism including a hand-operated lever accessible from said open end of the container and supported for pivotal movement about a substantially vertical axis, said lever being formed with a pair of longitudinally spaced stop sections adapted to overlie said track and trap said tie-down device to prevent movement thereof along said longitudinal axis.

* * * * *